United States Patent
Kawabata et al.

(10) Patent No.: US 12,507,636 B2
(45) Date of Patent: Dec. 30, 2025

(54) METHOD FOR DETERMINING OUTPUT DATA FROM CROP PLANT CHARACTERISTICS FOR A CROP PLANT, METHOD FOR CONTROLLING OPERATION OF AN AGRICULTURAL MACHINE, AGRICULTURAL MACHINE, AND COMPUTER PROGRAM PRODUCT

(71) Applicant: KUBOTA CORPORATION, Osaka (JP)

(72) Inventors: Masahiro Kawabata, Osaka (JP); Max Bouten, Osaka (JP); Leandro O. Santos, Osaka (JP); Peter Van Der Vlugt, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 342 days.

(21) Appl. No.: 18/042,098

(22) PCT Filed: Dec. 20, 2021

(86) PCT No.: PCT/EP2021/086750
§ 371 (c)(1),
(2) Date: Feb. 17, 2023

(87) PCT Pub. No.: WO2022/136249
PCT Pub. Date: Jun. 30, 2022

(65) Prior Publication Data
US 2023/0309459 A1 Oct. 5, 2023

(30) Foreign Application Priority Data
Dec. 23, 2020 (EP) .................................. 20216985

(51) Int. Cl.
G05B 17/02 (2006.01)
A01G 3/04 (2006.01)
A01G 7/06 (2006.01)

(52) U.S. Cl.
CPC ................ *A01G 7/06* (2013.01); *A01G 3/04* (2013.01); *G05B 17/02* (2013.01)

(58) Field of Classification Search
CPC . A01G 7/06; A01G 3/04; A01G 9/143; A01G 3/08; G05B 17/02; A01D 46/30; Y02A 40/25
See application file for complete search history.

(56) References Cited

U.S. PATENT DOCUMENTS 9,228,990 B2  1/2016  Lee et al.
11,076,589 B1 *  8/2021  Sibley ................. A01M 7/0014
(Continued)

FOREIGN PATENT DOCUMENTS

CN  101706968 A  5/2010
CN  104978765 A  10/2015
(Continued)

OTHER PUBLICATIONS

International Search Report for corresponding PCT Application No. PCT/EP2021/086750 dated Apr. 7, 2022, 3 pages.

*Primary Examiner* — Christopher E. Everett
(74) *Attorney, Agent, or Firm* — Leason Ellis LLP

(57) ABSTRACT

A method for determining output data from crop plant characteristics for a crop plant comprising, in a data processing system: providing measurement data detected for a crop plant; determining model data representing a three dimensional model of the crop plant from the measurement data; segmenting the three dimensional model; determining first crop plant characteristics for a first subpart of the crop plant provided in a first three dimensional segment; and providing output data at an output device. The output data comprise at least one of the following: media data; and operation control data indicative of operation control signals for controlling operating of an agricultural machine working on the crop plant, the operation control signals comprising first operation control signals determined from the first crop plant characteristics and configured to control operation of (Continued)

Figure 1:
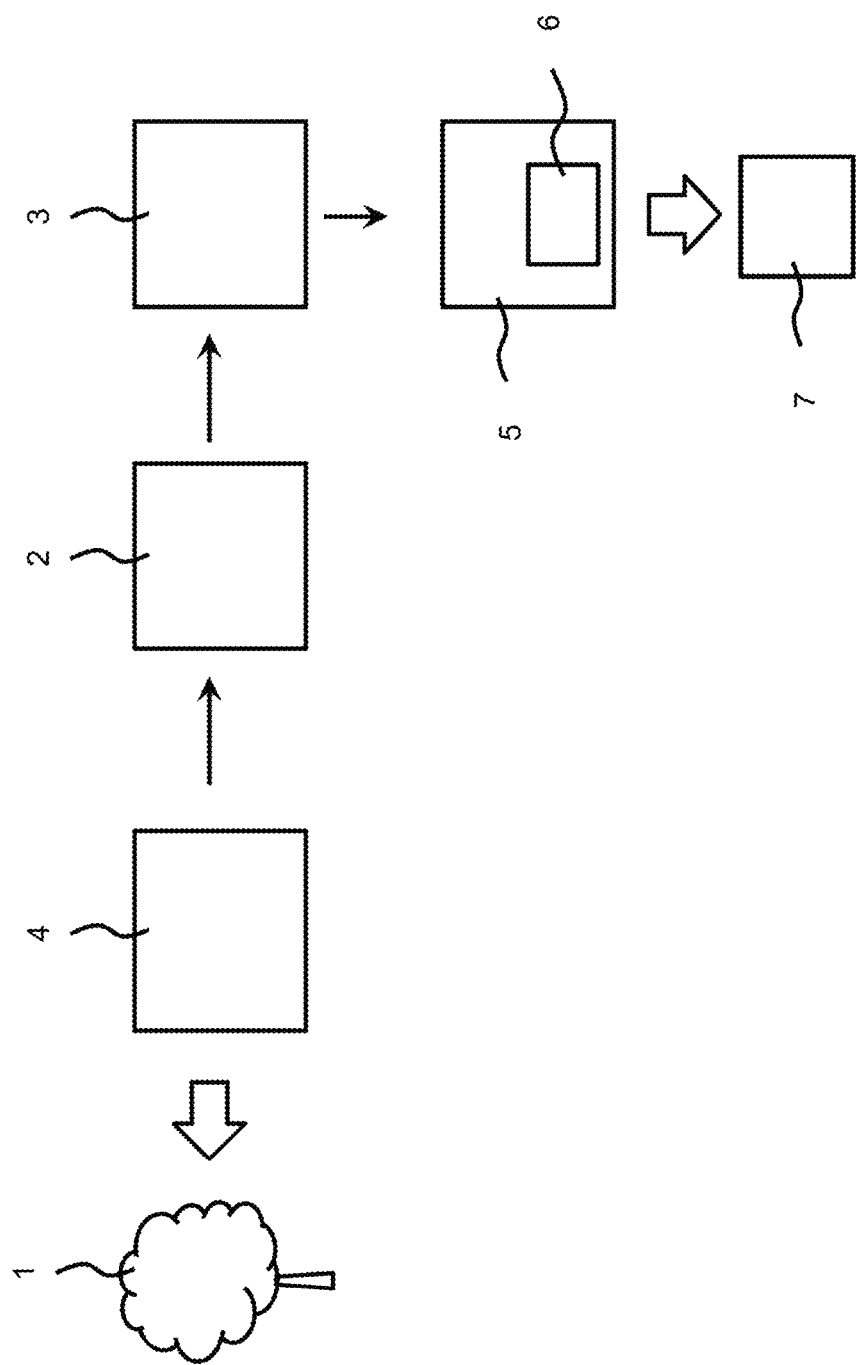

the agricultural machine for applying an agricultural treatment to the first subpart of the crop plant.

12 Claims, 3 Drawing Sheets

(56) References Cited

U.S. PATENT DOCUMENTS

| | | | | |
|---|---|---|---|---|
| 2001/0036295 | A1* | 11/2001 | Hendrickson | G06T 7/0004 |
| | | | | 382/110 |
| 2015/0124054 | A1* | 5/2015 | Darr | G01F 25/0084 |
| | | | | 348/46 |
| 2016/0026940 | A1* | 1/2016 | Johnson | A01D 91/00 |
| | | | | 705/7.11 |
| 2016/0232621 | A1* | 8/2016 | Ethington | A01B 79/02 |
| 2017/0181383 | A1 | 6/2017 | Shen et al. | |
| 2018/0047177 | A1* | 2/2018 | Obropta | G06T 17/20 |
| 2018/0343810 | A1 | 12/2018 | Counne | |
| 2019/0029178 | A1* | 1/2019 | Russel | A01D 46/30 |
| 2019/0278988 | A1* | 9/2019 | Papanikolopoulos | |
| | | | | G06V 20/17 |
| 2020/0184153 | A1* | 6/2020 | Bongartz | A01G 9/249 |
| 2022/0101554 | A1* | 3/2022 | Fu | G06V 10/82 |

FOREIGN PATENT DOCUMENTS

| | | |
|---|---|---|
| JP | 2008206438 A | 9/2008 |
| WO | 2017152224 A1 | 9/2017 |

* cited by examiner

METHOD FOR DETERMINING OUTPUT DATA FROM CROP PLANT CHARACTERISTICS FOR A CROP PLANT, METHOD FOR CONTROLLING OPERATION OF AN AGRICULTURAL MACHINE, AGRICULTURAL MACHINE, AND COMPUTER PROGRAM PRODUCT

CROSS-REFERENCE TO RELATED APPLICATIONS

This application is a U.S. National Stage Application under 35 U.S.C. § 371 of International Patent Application No. PCT/EP2021/086750, filed Dec. 20, 2021, which claims priority to EP patent application No. 20216985.0, filed Dec. 23, 2020, the contents of which are each hereby incorporated by reference in their respective entireties.

The present disclosure refers to a method for determining output data from crop plant characteristics from a crop plant. Further, the present disclosure refers to a method for controlling operation of an agricultural machine, an agricultural machine, and a computer program product.

BACKGROUND

Agricultural machines may be controlled in an operation for applying an agricultural treatment to one or more crop plants based on measurement data collected for the crop plant(s) before. For example, it has been proposed to control machine operation for harvesting an agricultural product on trees. According to another example, the agricultural machine may apply agricultural treatment by spraying or dispensing a spraying material to the crop plant(s).

With respect to the crop plant being a tree, document CN 101706968 A discloses a method for three dimensional model reconstruction of fruit tree trunks based on modularisation using image processing technology. Colour information values and corresponding spatial position coordinate values of a fruit tree trunk image are collected. Fruit tree branches are identified based on a three dimensional model reconstruction.

Document U.S. Pat. No. 9,228,990 B2 discloses a system for predicting production of a fruit tree, the system including a plant image obtaining unit collecting images of a fruit tree and confirming identification information about the fruit tree from the collected images, a branch pattern recognizing unit receiving an image of the fruit tree whose identification information is confirmed and extracting fruit bearing branches from among various kinds of branches belonging to the fruit tree, a fruit tree bud recognizing unit receiving an image of each of the extracted fruit bear in branches and extracting information about buds that fruits are actually to be born from among bud belonging to the fruit bearing branch, a meta database storing previous production predicting information about the fruit tree corresponding to the collected images, and a production estimating unit comparing the received bud information and the previous production predicting information to predict production of the fruit tree.

Document US 2017/0181 383 A1 refers to a pruning robot system comprising: a signal tag device for detecting and storing information of trees and crops and positioning information, and assisting positioning; a robot having a central processing device for storing and analysing data information of each part of the robot and issuing action instructions to each part of the robot, and a positioning and navigating device for positioning and navigating the robot, and for planning a path and providing obstacle-avoiding navigation for the robot according to an electronic map; a cloud platform terminal, which is in connection and communication with the central processing device of the robot and is used for storing data of trees and crops as well as detection data of the robot, and for planning a path for the robot through computing and experimenting according to the information data; and a map building device for building a three-dimensional electronic map corresponding to the plantation through field-detection by the robot.

SUMMARY

It is an object to provide improved technology for determining output data from crop plant characteristics for a crop plant which allow for better agricultural treatment to be applied to the crop plant on a sub crop plant level. Also, a method for controlling operation of an agricultural machine and an agricultural machine are being provided which allow for improved application of an agricultural treatment to a crop plant.

For solving the problem, a method for determining output data from crop plant characteristics for a crop plant is provided. Further, a method for controlling operation of an agricultural machine, and an agricultural machine are provided. In addition, a computer program product is provided. Further embodiments are disclosed in the dependent claims.

According to an aspect, a method for determining output data from crop plant characteristics for a crop plant according is provided, comprising: providing measurement data detected for a crop plant; determining model data representing a three dimensional model of the crop plant from the measurement data; segmenting the three dimensional model of the crop plant into a plurality of three dimensional segments; determining first crop plant characteristics for a first subpart of the crop plant provided in a first three dimensional segment of the plurality of three dimensional segments; and providing output data at an output device, the output data comprising at least one of the following: media data comprising at least one of video data and audio data indicative of the first crop plant characteristics for the first subpart of the crop plant provided in the first three dimensional segment; and operation control data indicative of operation control signals for controlling operating of an agricultural machine working on the crop plant, the operation control signals comprising first operation control signals determined from the first crop plant characteristics and configured to control operation of the agricultural machine for applying an agricultural treatment to the first subpart of the crop plant.

According to another aspect, a method for controlling operation of an agricultural machine is provided, the method comprising controlling operation of working tools of an agricultural machine for applying an agricultural treatment to a crop plant according to the operation control data determined by the method for determining output data from crop plant characteristics for the crop plant.

According to a further aspect, an agricultural machine is provided, comprising: working tools configured to apply an agricultural treatment to a crop plant; and a control unit functionally connected to the working tools and configured to control operation of the working tools for applying the agricultural treatment to the crop plant according to operation control data determined by the method for determining output data from crop plant characteristics for the crop plant.

Further a computer program product is provided.

The technology proposed comprises applying segmentation to the three dimensional model of the crop plant, thereby, segmenting the three dimensional model of the crop plant into a plurality of three dimensional or spatial segments. Thus, a grid structure (segmentation) is applied for providing the plurality of three dimensional segments from the three dimensional model of the crop plant. Following, crop plant characteristics can be determined segment-specific (e.g. segment by segment) for the sub part of the crop plant covered by the segment. The three dimensional segments comprise a sub part of the crop plant. Segment-specific characteristics for the sub part received or provided in a three dimensional segment assigned to the sub part are determined. The crop plant characteristics assigned to a segment provide for characterization of the sub part of the crop plant assigned to the segment as whole. Thus, the segment-specific characteristics may be void or free of branch specific characteristics.

The segmentation provides for a coarse dividing or segmenting of the three dimensional model of the crop plant into the plurality of three dimensional segments.

In operation, working tools of an agricultural machine may be navigated or located for applying the agricultural treatment to the crop plant based on the three dimensional segments. Thus, the agricultural treatment may be applied segment after segment, wherein the working tools will be controlled based on operation control signals assigned to a specific one of the three dimensional segments.

The technology proposed can be applied based on a limited number of data necessary for determining the output data, thereby, saving resources for data processing.

The method may comprise determining second crop plant characteristics for a second subpart of the crop plant provided in a second three dimensional segment of the plurality of three dimensional segments, the second three dimensional segment being different from the first three dimensional segment. The method may further comprise providing the output data comprising at least one of the following: media data comprising at least one of video data and audio data indicative of the second crop plant characteristics for the second subpart of the crop plant provided in the first three dimensional segment; operation control data comprising second operation control signals determined from the second crop plant characteristics and configured to control operation of the agricultural machine for applying an agricultural treatment to second subpart of the crop plant, wherein the second operation control signals are different from the first operation control signals. Depending on whether the output data is provided for the first or the second three dimensional segment, different crop plant characteristics are determined. Different crop plant characteristics will cause at least one of different media data and different operation control data. Thereby, the operation control data are determined segment-specific (not branch-specific) for different once of the three dimensional segments.

At least one of the first operation control signals and the second operation control signals may be configured to control operation of the agricultural machine for applying at least one agricultural treatment selected from the following: harvesting, spraying, and pruning. The agricultural treatment applied to the crop plant may comprise one or more different treatments such as spraying, harvesting, and pruning. Also, the agricultural treatment may be applied to a plurality of crop plants, wherein for each of the crop plants output data are provided as described for the crop plant.

The media data may comprise treatment media data indicative of an agricultural treatment to be applied to at least one of the first subpart of the crop plant and the second subpart of the crop plant, the agricultural treatment comprising at least one of the following: harvesting, spraying, and pruning.

With respect to spraying, a spraying material may be applied segment-specific to the crop plant such as a plant protection product and/or a fertilizer. With respect to harvesting, it may comprise picking some fruit in one or more of the three dimensional segments of the crop plant being, for example, a tree. With respect to pruning the media data can provide for decision support on manual branch pruning. For example, by a segment-specific analysis of branch density within the three dimensional segment, the output data may provide information about actual and target branch density within the three dimensional segment. Based on such information provided by the output data, a worker or user applying pruning can select the right branches to be pruned based on the information provided by the output data. It will help for increasing quality and performance of pruning.

In an embodiment, the output data may be indicative of a comparison of three dimensional segments of different crop plants within a field or a plantation, the comparison indicating, for example, different pruning or trimming status of the different three dimensional segments. In response, further pruning may be applied for having optimized similar level of pruning for the different three dimensional segments from different crop plants within the field or plantation.

The segmenting may comprise segmenting the three dimensional model of the crop plant into a plurality of three dimensional segments with each of the three dimensional segments having the same segment volume. In general, characteristic (parameters) of the three dimensional segments such as size or volume of the segment can be defined depending on the agricultural treatment to be applied to the crop plant. Providing each of the three dimensional segments with the same segment volume can support feasibility of comparing different three dimensional segments from one and the same crop plant or three dimensional segments from different crop plants. In an embodiment, the three dimensional segments for only one crop plant or for a plurality of crop plants may be provided with identical edge length.

The segmenting may comprise segmenting the three dimensional model of the crop plant into a plurality of three dimensional segments with each of the three dimensional segments comprising a plurality of main plant branches, wherein each of the main plant branches is provided with a plurality of sub plant branches. The main plant branch refers to a branch growing out of the plant trunk. Sub branches are growing out of the main plant branch. Providing a plurality of main plant branches within the three dimensional segment support coarse segmentation of the three dimensional model of the crop plant on a non-branch-specific level. Instead of branch-specific agricultural treatment, segment-specific treatment (for the plurality of branches within the segment) is supported.

For the method, the step of providing may comprise providing measurement data detected for a tree. The tree or some other crop plant may be provided in the field or a plantation along rows of crop plants (trees).

In an embodiment, the segmenting may comprise providing crop plant identification data indicative of a type of plant of the crop plant; providing segmentation characteristics data indicative of a plurality of segment volumes, each of the segment volumes assigned to at least one type of plant from a plurality of different types of plants; selecting a segment volume for the segmenting for the crop plant identified by the crop plant identification data from the plurality of segment volumes; and segmenting the three dimensional model of the crop plant into the plurality of three dimensional segments having the selected segment volume. For a plurality of different types of plants a type-specific segment value is defined. Depending on the type of crop plant identified by the crop plant identification data, the type-specific segment value(s) is (are) selected. Following, segmentation is applied with such selected segment volume for the crop plant. For example, segment value(s) different for different types of plants may very in dependence on the height of the crop plant. The three dimensional segments for a first type of crop plant may have a first segment volume which is different from a second segment volume for a second type of crop plant, the second type of crop plant having a plant height which is smaller than the plant height of the first type of crop plant. For example, different plant species such as tree species may have assigned different segment value(s).

For the method, the step of segmenting may comprise defining a crop plant coordinate system for the three dimensional model of the crop plant, wherein the crop plant coordinate system is a 3-axis coordinate system and one of three base axis of the crop plant coordinate system is running along a line of planting for a plurality of crop plants, the crop plant being one from the plurality of crop plants; and segmenting the three dimensional model of the crop plant into the plurality of three dimensional segments, wherein three dimensional segments being provided in the crop plant coordinate system. Having such crop plant coordinate system applied will support feasibility of comparing three dimensional segments for different crop plants provided in the row or line of crop plants. It enables the comparison and navigation always in the same way of describing the part of the crop plant. It allows for defining the three dimensional segments and crop plant treatment, e.g. (a) spray part of the crop plant which is aligned to the next crop plant in the row of crop plants to avoid transfer of disease between crop plants, and/or (b) pick fruits on the south part of the crop plant in specific three dimensional segments.

Alternatively, the crop plant coordinate system may be aligned with a global coordinate system. For example, the x-axis may be running along South direction of the global coordinate system.

The output data may comprise at least one of the following: media data comprising at least one of video data and audio data indicative of segment-specific first crop plant characteristics for the first subpart of the crop plant provided in the first three dimensional segment, the segment-specific first crop plant characteristics being indicative of characteristics for the subpart of the crop plant as whole; and operation control data indicative of operation control signals for controlling operating of an agricultural machine working on the crop plant, the operation control signals comprising first operation control signals determined from the first crop plant characteristics and configured to control operation of the agricultural machine for applying an agricultural treatment to the first subpart of the crop plant.

In an embodiment, the segmenting of the three dimensional model of the crop plant may comprise: receiving segmenting data indicative of at least one segmenting parameter, and segmenting of the three dimensional model of the crop plant into the plurality of three dimensional segments according to the at least one segmenting parameter. The segmenting parameter may be selected from the following group: minimum number of three dimensional segments, maximum number of three dimensional segments, minimum edge length of three dimensional segments, maximum edge length of three dimensional segments, minimum volume of three dimensional segments, and minimum volume of three dimensional segments.

In an embodiment, the at least one segmenting parameter may be determined in response to receiving treatment information indicative of at least one crop plant treatment to be conducted. The at least one segmenting parameter is determined to be a treatment dependent segmenting parameter. Such treatment information, for example, may be received by user input. Alternatively, treatment information may be determined from an analysis of the measurement data detected for the crop plant, such as image data analysis. For example, form such data analysis it may be determined that pruning of a tree is to be applied. In response to such conclusion made from the data analysis, the at least one segmenting parameter may be provided for the segmenting of the three dimensional model of the crop plant being a tree in such embodiment.

Alternatively, if the treatment information is indicating spraying, for the three dimensional segments a side face area may be applied which about equal to a working or application size (area) of a spray nozzle of the agricultural sprayer which, for example, has a diameter of 25 to 50 cm. So the minimum segment size is selected to be at least as large as the minimum application size (or larger) and within this minimum segment volume the part of the crop plant needs to be describable in a clear way, e.g. majority of the volume is covered by leafs and not significantly different parts of the plant.

The embodiments described above with respect to the method for determining output data from crop plant characteristics for the crop plant may be provided for the method for controlling operation of the agricultural machine and/or the agricultural machine mutatis mutandis.

DESCRIPTION OF FURTHER EMBODIMENTS

Figure 2:
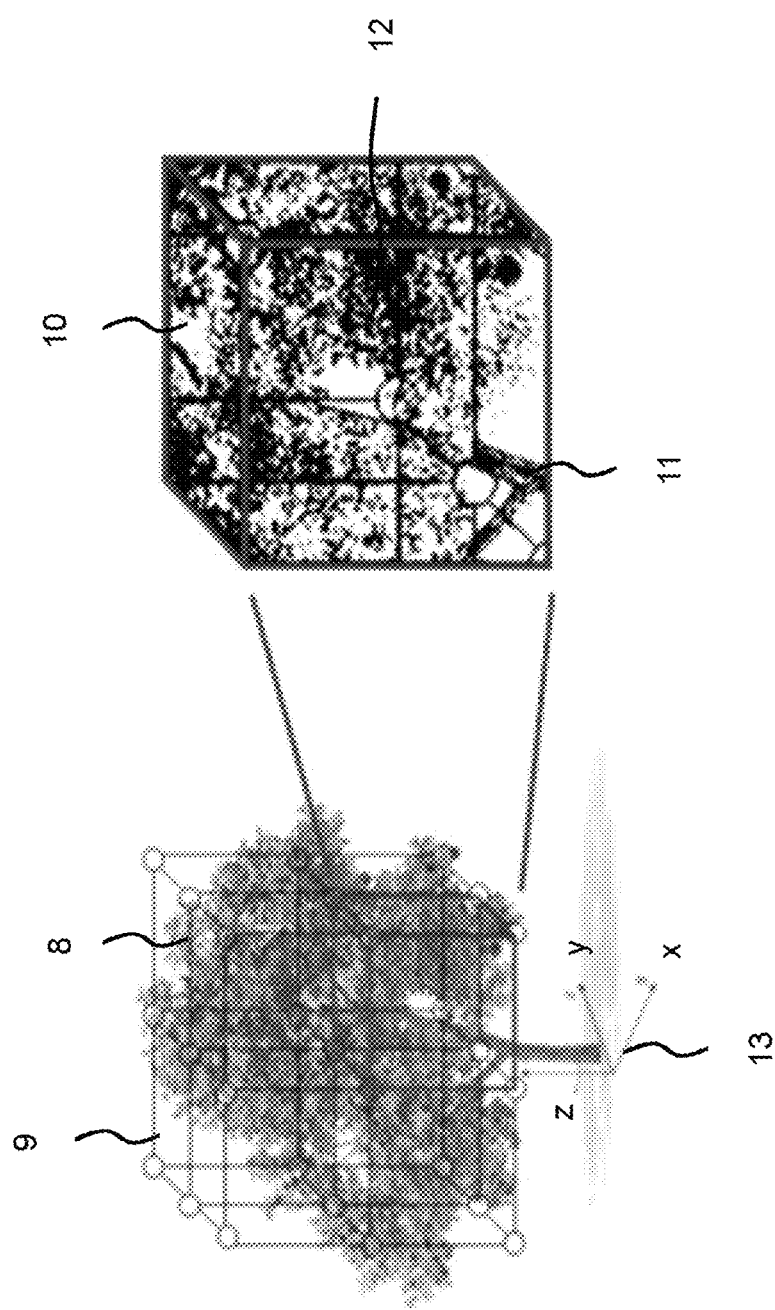
Figure 3:
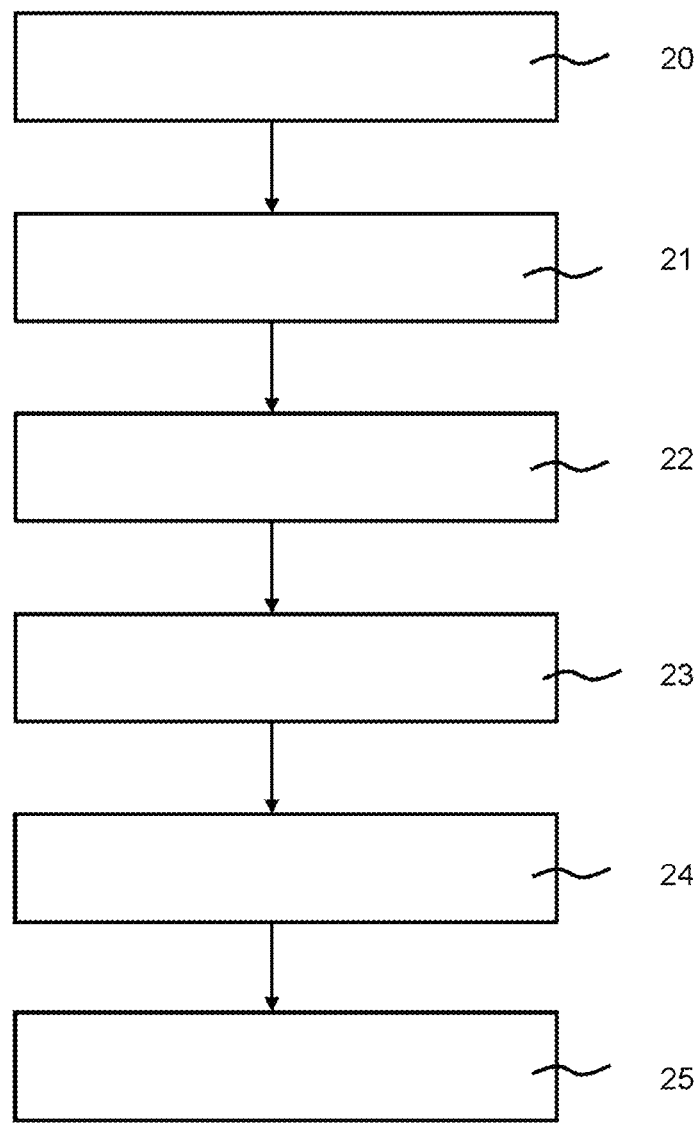

Following, further embodiments are described with reference to figures. In the figures, show:

FIG. 1 a schematic representation of an arrangement for determining output data from crop plant characteristics for a crop plant;

FIG. 2 a schematic representation of a crop plant being a tree for which a segmentation into a plurality of three dimensional segments is applied; and FIG. 3 a schematic representation of a flow chart for a method for determining output data from crop plant characteristics for a crop plant.

FIG. 1 shows a schematic representation of an arrangement for determining output data from crop plant characteristics for a crop plant 1, which, for example, is a tree, but may be any other crop plant. A data processing device 2 is provided with one or more processors for processing electronic data. The data processors device 2 is configured to determine output data from crop plant characteristics for the crop plant 1 according to a method which is explained in detail below.

According to FIG. 1, the output data are provided to an output device 3 connected to the data processing device 2. The output device 3 may be provided with an interface configured for outputting the output data via wired and/or wireless data transmission.

Measurement data to be received by the data processing device 2 may be provided by a measurement device 4 which is configured to collect measurement data for the crop plant 1. For example, image data may be detected by the measurement device 4. Such image data, for example, may be detected by a satellite device, a drone device, and/or a ground based device. The different devices may be provided with a camera device for detecting the image data. Image data analysis may be conducted by the measurement device 4 and/or the data processing device 2 for determining the measurement data which provide an input for the method for determining the output data from the crop plant characteristics for the crop plant 1. Different methods for image data analysis are known as such.

The output data to be provided to the output device 3 may comprise media data comprising at least one of audio data and video data. For example, the media data may be outputted by a display device provided with the output device 3. As an alternative or in addition, the output data may comprise audio data to be outputted by a speaker provided with the output device 3.

The output data may comprise, in addition or as an alternative to the media data, operation control data indicative of operation control signals which are configured to control operation of an agricultural machine 5 provided with a control unit 6 and working tools 7. The agricultural machine 5 is configured to apply agricultural treatment to the crop plant 1, for example, spraying, harvesting and/or pruning. The operation control signals provided via the output device 3 are processed by the control unit 6. In response, the working tools 7 of the agricultural machine 5 are controlled for applying the agricultural treatment to the crop plant 1 according to the operation control signals, such agricultural treatment comprising, for example, at least one of harvesting, spraying, trimming, and pruning.

The agricultural machine 5 may be selected from the following group of agricultural machines: sprayer, harvesting machine, harvesting robot, pruning machine, pruning robot, thinning machine, thinning robot, trimming machine, and trimming robot.

Following, by referring to FIGS. 2 and 3, a method for determining the output data is described in further detail.

After providing the measurement data in the data processing device 2 (step 20), a three dimensional model 8 of the crop plant 1, which is, for example, a tree, is calculated by the data processing device 2 for the crop plant 1 for which the measurement data have been detected (step 21). In step 22, a segmentation is applied to the three dimensional model 8 of the crop plant 1. By the segmentation a grid structure 9 is applied to the three dimensional model 8 of the crop plant 1. Grid size or segment size may be applied or selected dependent on different parameters such as having a single crop plant or a plurality of crop plants, crop plant specie. By applying segmentation a plurality of three dimensional segments 10 (see FIG. 2), each of the three dimensional segments 10 comprising a plurality of main branches 11 of the crop plant 1 and a plurality of sub branches 12 for a sub part of the crop plant 1 provided within the respective three dimensional segment 10.

For segmentation, a crop plant (tree) specific coordinate system 13 may be applied. The coordinate system 13 may be a three-axis coordinate system. For example, a first axis (x axis) may be defined by topography vertical to the surface of the soil. In an embodiment, the first axis may be parallel to a crop plant or tree line of a plantation of crop plants.

In the process of segmentation, parameters of the three dimensional segments 8 may be defined in response to user input. In addition or as an alternative, parameters of the three dimensional segments 8 such as volume and/or edge length may be selected in dependence on a type of plant (plant specie) for the crop plant 1.

In step 23, crop plant characteristics are determined for the sub part of the crop plant 1 for three dimensional segments 10 (segment-specific). Crop plant characteristics are determined for the sub part of the crop plant 1 which is provided within the specific three dimensional segment 10. Thus, the crop plant characteristics determined for a specific three dimensional segment 10 are indicative of crop plant characteristics for the sub part of the crop plant 1 within the segment as whole.

In step 24, the output data are determined from the crop plant characteristics. The output data are provided to the output device 3 in step 25.

With respect to spraying, based on the output data, discrete parts of the crop plant 1 can be treated with plant protection products and/or fertilizers, for example, by applying a spraying material. Through the definition of equal volume sizes and relative positions of the three dimensional segments 10 for each crop plant of a plurality of crop plants, the decision making process can be novelized as the farmer can define specific parts of the crop plant 1 to be treated in a very lean and simple way. In parallel, the automation process of the application can be accelerated through the reduction of output data which is needed to be processed and transferred for e.g. navigation.

With respect to harvesting, the grid structure 9 applied for segmentation can be utilized for manual but also (semi-)automated harvesting processes. By the reduced absolute data needed, also low cost devices can be used for example by workers to navigate through the field or plantation. Crop plant specific navigation is possible in a simple way e.g.: Picking ripe fruit in specific sector of each crop plant due to different ripening stages (top/down inside/outside etc.). Automated harvesting can benefit from crop plant segmentation through improved processing speed of data for example to efficiently balance the workload between several picking devices.

With respect to pruning or trimming, the grid structure 9 can easily be utilized for decision support on manual branch pruning (output data being media data). By means of volume specific analysis (specific for three dimensional segments) of branch density, the user, by means of the output data, gets additional information about actual and target branch density within a defined three dimensional segment 10. Based on this, the user can select the right branches to be pruned based on this support and his expertise. This collaboration increases the quality and performance of manual pruning. Also, an efficient comparison of crop plants within a field or plantation is possible due to uniform definition of discrete crop plant parts.

Based on existing tree detection and localization, new technology is provided for crop plant specific segmentation. The segmentation into the plurality of three dimensional segments 10 enables the storage and processing of the output data on a sub-tree level, e.g. branch distribution, fruit density, leaf density etc. The minimum segment size and shape may be defined in a uniform way for a defined area (i.e. plantation, field, groove), there can be several mesh systems for different purposes, accumulation and/or segmentation possible.

Depending on the process objective, e.g. yield prediction, and/or disease treatment, the three dimensional segments 10 can be divided and/or consolidated, e.g. all segment on the top layer. Thereby, a group of three dimensional segments 10 may be created, e.g. all segment on a specific height to be trimmed or sprayed. Such handling of the three dimensional segments can support compatibility to many agricultural machines considering different technology levels. Beside machine control, this may also be helpful to understand, for example, crop plant performance better, e.g. which part/height of the crop plant (for example, tree) has highest/lowest performance, to take better decision for the crop plant treatment.

Information about the tree coordinate systems 13 and the three dimensional segments 10 can stored for a (crop plant) lifetime to enable comparisons and estimations based on historical data.

The features disclosed in this specification, the figures and/or the claims may be material for the realization of various embodiments, taken in isolation or in various combinations thereof.

The invention claimed is:

1. A method for determining output data from crop plant characteristics for a crop plant, the method comprising, in a data processing system having one or more processors:
   providing measurement data detected for a crop plant;
   determining model data representing a three dimensional model of the crop plant from the measurement data;
   segmenting the three dimensional model of the crop plant into a plurality of three dimensional segments;
   determining first crop plant characteristics for a first subpart of the crop plant provided in a first three dimensional segment of the plurality of three dimensional segments; and
   providing output data at an output device, the output data comprising at least one of the following:
      media data comprising at least one of video data and audio data indicative of the first crop plant characteristics for the first subpart of the crop plant provided in the first three dimensional segment; and
      operation control data indicative of operation control signals for controlling operating of an agricultural machine working on the crop plant, the operation control signals comprising first operation control signals determined from the first crop plant characteristics and configured to control operation of the agricultural machine for applying an agricultural treatment to the first subpart of the crop plant,
   wherein the segmenting comprises:
      providing crop plant identification data indicative of a type of plant of the crop plant;
      providing segmentation characteristics data indicative of a plurality of segment volumes, each of the segment volumes assigned to at least one type of plant from a plurality of different types of plants;
      selecting a segment volume for the segmenting for the crop plant identified by the crop plant identification data from the plurality of segment volumes; and
      segmenting the three dimensional model of the crop plant into the plurality of three dimensional segments having the selected segment volume.

2. The method of claim 1, further comprising:
   determining second crop plant characteristics for a second subpart of the crop plant provided in a second three dimensional segment of the plurality of three dimensional segments, the second three dimensional segment being different from the first three dimensional segment; and
   providing the output data comprising at least one of the following:
      media data comprising at least one of video data and audio data indicative of the second crop plant characteristics for the second subpart of the crop plant provided in the first three dimensional segment;
      operation control data comprising second operation control signals determined from the second crop plant characteristics and configured to control operation of the agricultural machine for applying an agricultural treatment to second subpart of the crop plant, wherein the second operation control signals are different from the first operation control signals.

3. The method of claim 1, wherein at least one of the first operation control signals and the second operation control signals are configured to control operation of the agricultural machine for applying at least one agricultural treatment selected from the following: harvesting, spraying, and pruning.

4. The method of claim 1, wherein the media data comprise treatment media data indicative of an agricultural treatment to be applied to at least one of the first subpart of the crop plant and the second subpart of the crop plant, the agricultural treatment comprising at least one of the following: harvesting, spraying, and pruning.

5. The method of claim 1, wherein the segmenting comprises segmenting the three dimensional model of the crop plant into a plurality of three dimensional segments with each of the three dimensional segments having the same segment volume.

6. The method of claim 1, wherein the segmenting comprises segmenting the three dimensional model of the crop plant into a plurality of three dimensional segments with each of the three dimensional segments comprising a plurality of main plant branches, wherein each of the main plant branches is provided with a plurality of sub plant branches.

7. The method of claim 1, wherein the providing comprises providing measurement data detected for a tree.

8. The method of claim 1, wherein the segmenting comprises:
   defining a crop plant coordinate system for the three dimensional model of the crop plant, wherein the crop plant coordinate system is a 3-axis coordinate system and one of three base axis of the crop plant coordinate system is running along a line of planting for a plurality of crop plants, the crop plant being one from the plurality of crop plants; and
   segmenting the three dimensional model of the crop plant into the plurality of three dimensional segments, wherein three dimensional segments being provided in the crop plant coordinate system.

9. The method of claim 1, wherein the output data comprises at least one of the following:
   media data comprising at least one of video data and audio data indicative of segment-specific first crop plant characteristics for the first subpart of the crop plant provided in the first three dimensional segment, the segment-specific first crop plant characteristics being indicative of characteristics for the subpart of the crop plant as whole; and
   operation control data indicative of operation control signals for controlling operating of an agricultural machine working on the crop plant, the operation control signals comprising first operation control signals determined from the first crop plant characteristics and configured to control operation of the agricultural machine for applying an agricultural treatment to the first subpart of the crop plant.

10. The method of claim 1, further comprising controlling operation of working tools of an agricultural machine for applying an agricultural treatment to a crop plant according to operation control data.

11. An agricultural machine, comprising:
working tools configured to apply an agricultural treatment to a crop plant; and
a control unit functionally connected to the working tools and configured to control operation of the working tools for applying the agricultural treatment to the crop plant according to operation control data determined by the method of claim 1.

12. A computer program product comprising program instructions which, when the program instructions are executed by a computer, cause the computer to carry out the method of claim 1.

* * * * *